US012691310B2

(12) United States Patent
McBee

(10) Patent No.: US 12,691,310 B2
(45) Date of Patent: Jul. 28, 2026

(54) OVERHEAD POWER LINE FIRE PREVENTION SYSTEM

(71) Applicant: California State University, Fresno, Long Beach, CA (US)

(72) Inventor: Kerry McBee, Fresno, CA (US)

(73) Assignee: CALIFORNIA STATE UNIVERSITY, FRESNO, Fresno, CA (US)

( * ) Notice: Subject to any disclaimer, the term of this patent is extended or adjusted under 35 U.S.C. 154(b) by 642 days.

(21) Appl. No.: 18/132,189

(22) Filed: Apr. 7, 2023

(65) Prior Publication Data

US 2023/0321470 A1 Oct. 12, 2023

Related U.S. Application Data

(60) Provisional application No. 63/329,285, filed on Apr. 8, 2022.

(51) Int. Cl.
| | |
|---|---|
| *A62C 3/16* | (2006.01) |
| *G08B 17/06* | (2006.01) |
| *G08B 25/10* | (2006.01) |
| *H02J 13/12* | (2026.01) |
| *H02J 13/36* | (2026.01) |

(52) U.S. Cl.
CPC ............... *A62C 3/16* (2013.01); *G08B 17/06* (2013.01); *G08B 25/10* (2013.01); *H02J 13/12* (2026.01); *H02J 13/36* (2026.01)

(58) Field of Classification Search
CPC .......... A62C 3/16; G08B 17/06; G08B 25/10; H02J 13/12; H02J 13/36
See application file for complete search history.

(56) References Cited

U.S. PATENT DOCUMENTS

| | | | | |
|---|---|---|---|---|
| 3,219,744 | A * | 11/1965 | Mazziotti | G01S 7/4021 |
| | | | | 434/5 |
| 6,492,897 | B1 * | 12/2002 | Mowery, Jr. | H04B 3/54 |
| | | | | 340/505 |
| 2003/0128149 | A1 * | 7/2003 | Miceli | G01S 7/412 |
| | | | | 342/25 R |
| 2006/0009887 | A1 * | 1/2006 | Rubin | G01C 23/00 |
| | | | | 701/9 |
| 2016/0276725 | A1 * | 9/2016 | Barnickel | H04B 3/54 |
| 2021/0194497 | A1 * | 6/2021 | Lamb | H03H 17/0628 |
| 2022/0406158 | A1 * | 12/2022 | Mahmoud | H02H 7/226 |

* cited by examiner

*Primary Examiner* — Ziaul Karim
(74) *Attorney, Agent, or Firm* — Central California IP Group, P.C.; Andrew D. Fortney

(57) ABSTRACT

A method, devices and system for detecting power line issues are described. A variety of sensors detect conductor movement, operating temperature, and remote line current. The data is analyzed based on a neural network to determine galloping or swinging conductors, broken jumpers or connectors, vegetation interference, a fallen line, and equipment failure. Once a determination is made about a line issue, appropriate measures are undertaken to fix the detected issues.

20 Claims, 7 Drawing Sheets

OVERHEAD POWER LINE FIRE PREVENTION SYSTEM

CLAIM OF PRIORITY

This application claims the benefit of priority to U.S. Provisional Application Ser. No. 63/329,285, filed on Apr. 8, 2022, which is incorporated herein by reference in its entirety.

TECHNICAL FIELD

Embodiments pertain to fire prevention in overhead power lines.

BACKGROUND

Every year utility companies throughout the United States experience thousands of outages, causing events on their transmission and distribution systems. Utility companies experience approximately 4000 equipment failures every year. To protect the public from electric shock or electrocution, electric grids are designed with protective devices that de-energize the system if grid equipment fails or results in significant variations in system voltage, current and/or frequency. Once an event is identified, circuit breakers de-energize the system so that current does not continue to flow to avoid a short circuit to ground. Unfortunately, applying traditional electric grid protection equipment in rural or remote locations does not prevent overhead power lines from initiating wildfires when overhead devices fail or environmental conditions create fire hazards.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
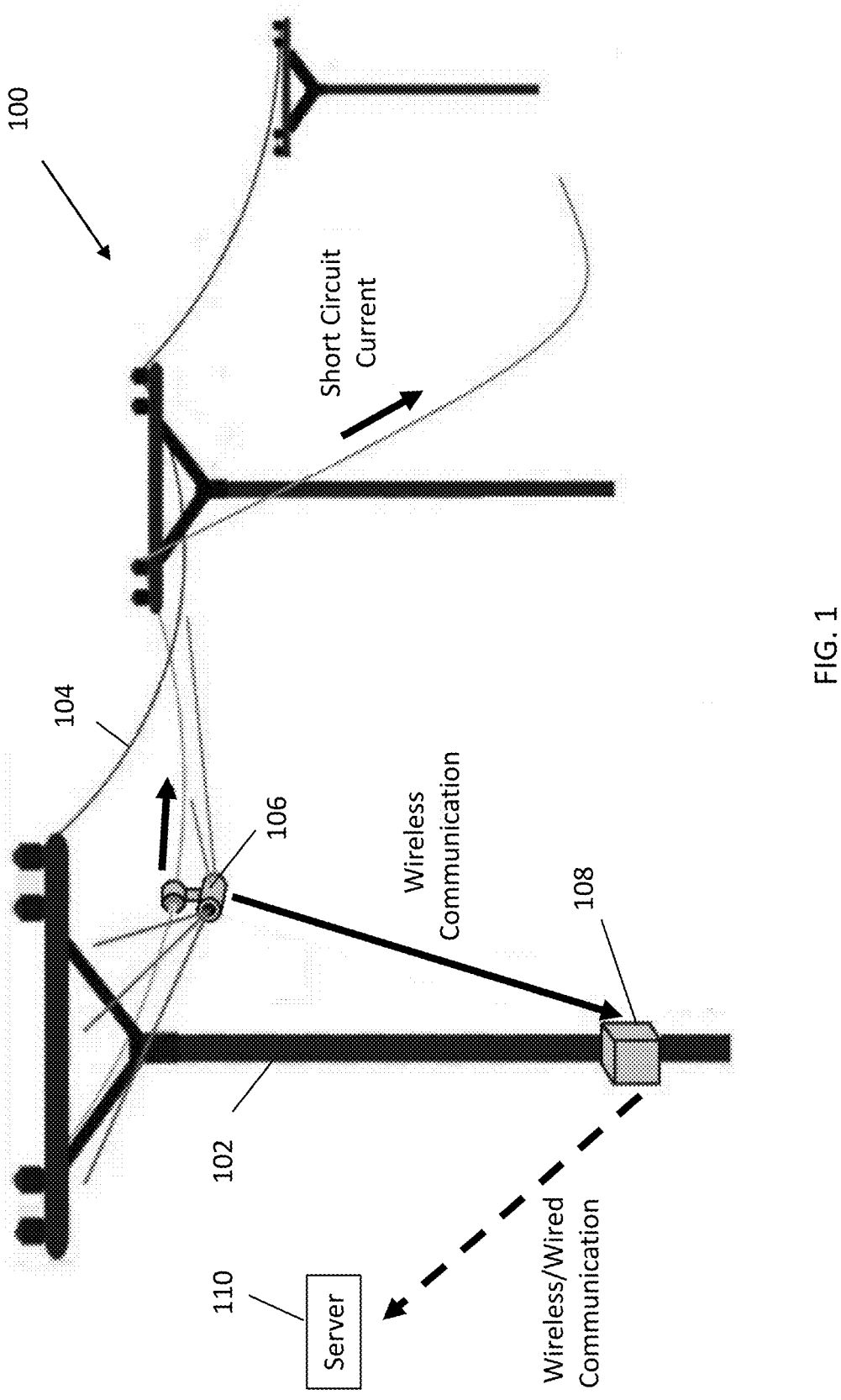
FIG. 1 illustrates a system in accordance with some aspects.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As above, environmental changes have increased the duration of fire season in many locations throughout the world, including California. Hotter temperatures and a dryer climate lead to vegetation and dwellings that are more susceptible to fire. The California Public Utility Commission (CPUC) reported that California electric utilities caused more than 2000 fires between 2016 and 2019. In fact, three of the largest fires in California history were initiated by overhead power line equipment failures or vegetation interference with overhead power lines.

In 2019, federal courts ruled that California inverse condemnation laws apply to investor-owned utility companies like PG&E, which makes them liable for fire damage regardless of operational negligence. As such, utility companies are not supposed to pass on wildfire damage costs to customers through rate increases. In response to the legal ruling and to protect the public, many government agencies and electric utilities have initiated new guidelines, prevention procedures, and system-hardening activities to reduce fire probability. In 2019, California passed SB 901, which requires all electric utility companies to submit fire mitigating plans. One of the largest obstacles facing utilities is the lack of monitoring capabilities for a system that can span thousands of miles (250,000 miles in California). Accordingly, it is desirable for utility companies to provide monitoring capabilities that enhances fire prevention measures significantly.

Fire Causes

Overhead power lines can ignite wildfires in several different ways. Because the above-described utility protection system only monitors electrical attributes (voltage, current, frequency, etc. . . . ), adverse physical conditions that can ignite wildfires go unmonitored. Wildfires in rural locations may be ignited by overhead power lines due to the following conditions that can go unnoticed by traditional power system protective devices:

Cause 1—Galloping/swinging Conductors

Cause 2—Broken Jumpers/Connectors

Cause 3—Vegetation Interference

Cause 4—Fallen Power Line(s)

Cause 5—Failing Electrical Equipment

A Real-time Overhead Monitoring (ROAM) system may be designed to identify the above electric grid overhead power line physical issues that can result in wildfire ignition or an unplanned outage. As described herein, the ROAM system includes a neural network and sensors installed on overhead conductors. The ROAM sensors create an automated observation network that can identify grid deficiencies that include galloping conductors, one or more fallen conductors, pending conductor failure, and (electrical) grid equipment entering pre-failure mode. The ROAM system is able to identify and report the grid deficiencies within a short amount of time (e.g., about a few milliseconds) through wireless and/or wired communications. The presence of the fallen conductors may be detected within an extended distance, such as about a mile. Similarly, a pending conductor failure may be detected within a predetermined span, such as between adjacent poles for example. The grid equipment may include, for example, arrestors, switches, connections, and terminations.

As described herein, various applications will identify and/or prevent the occurrence of all of these causes. Once defined, the applications can be applied to varying equipment located on an overhead power line (switches, conductors, insulators, etc.).

FIG. 1 illustrates a system in accordance with some aspects. As shown, the system 100 includes power poles 102 that support high-voltage lines 104. At least one sensor 106 may be disposed on each of the lines 104 within a predetermined span (e.g., between adjacent poles 102 or between a set number of poles 102). The sensor 106 may supply data to at least one data collector 108 using a wireless protocol, such as Bluetooth, WiFi, or Zigbee. The sensors 106 may be disposed such that each sensor 106 is able to communicate with an associated data collector 108, e.g., each sensor 106 in a particular span may communicate with the data collector 108 for that span.

The sensor 106 may include individual sensors that detect different types of data. For example, the sensor 106 may include a motion sensor that detects motion (swing) of the high-voltage line 104 on which the sensor 106 is disposed. The motion sensor may use, for example, radar to detect the motion of the high-voltage line 104. For example, a millimeter-wave Frequency-Modulated Continuous Wave (FMCW) Radar System may be used to identify overhead conductor and conductor jumper movement that is sufficient to cause conductor connectors to break (fallen conductor) and/or identify galloping conductors that can create sparks due to line-to-line faults. The radar can detect conductor movement (swing) efficiently regardless of weather and light conditions. Thus, radar technology may be used to identify adverse conditions related to severe conductor movement. The radar system may be installed in, for example, Overhead Bladed Switches, Overhead Cutout Switches, Voltage Regulators or Conductor Connectors.

Other sensors may include optical sensors that detect light from one or more stationary emitters (e.g., housed in the data collector 108 or another piece of equipment) that is directed towards the optical sensor. Alternatively, or in addition, the sensor 106 may include light emitters and/or the other equipment may include optical sensors (and/or emitters). The optical sensors and/or emitters may be active within a predetermined angular range of motion of the sensors and/or emitters.

The motion sensor (e.g., radar or optical) may determine the amount of movement, as well as the frequency of movement, and length of time of the movement. This may permit further processing to determine whether failure is likely (or imminent), or whether the motion is within tolerance parameters such that failure is unlikely. The thresholds for the parameters (amount, frequency, time, likelihood) may be user-set based on previously determined parameters.

Figure 2:
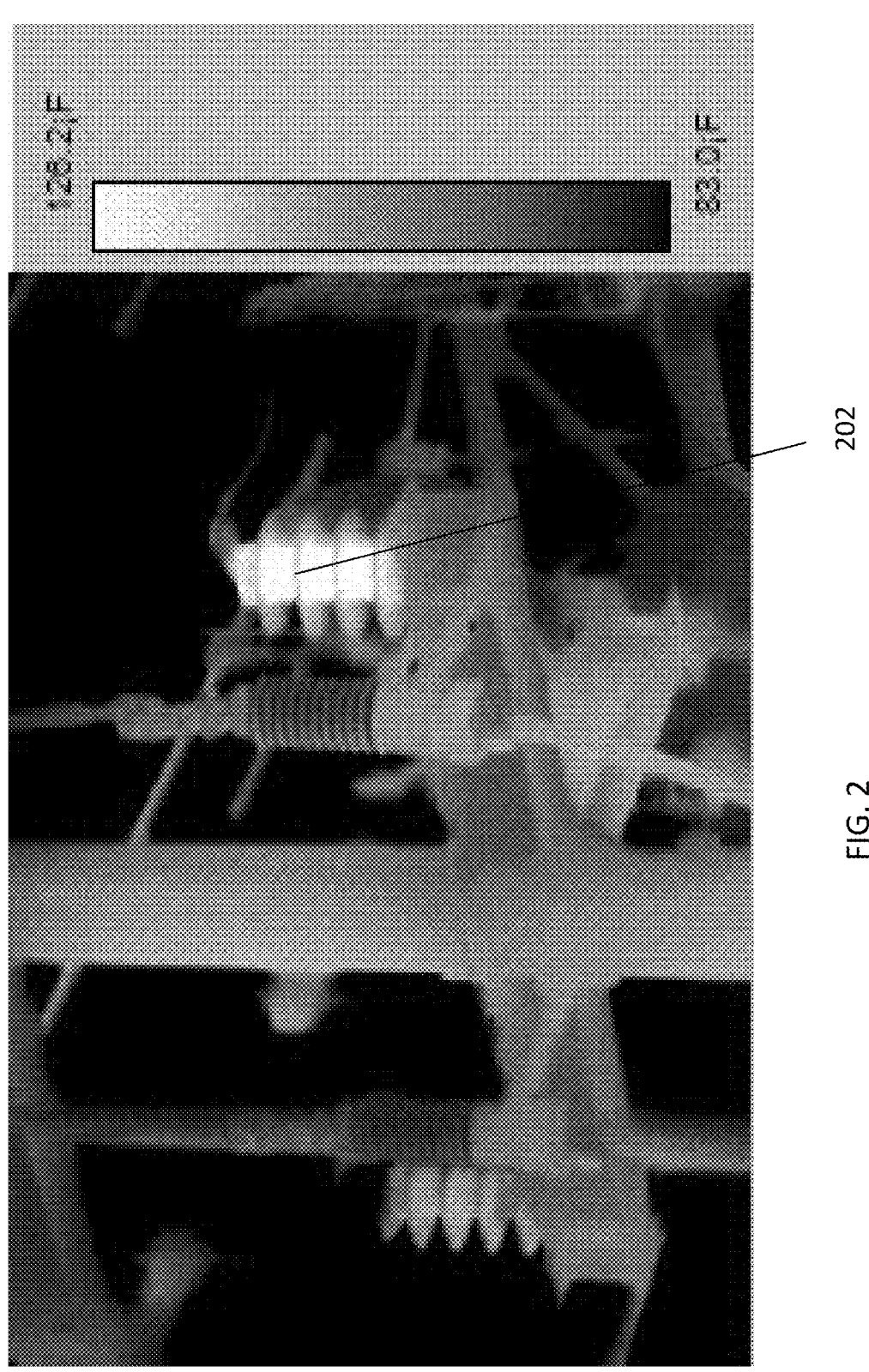
FIG. 2 illustrates an infrared image in accordance with some aspects.

The sensor 106 may additionally include an equipment failure sensor that detects failure of the high-voltage equipment on the power pole 102. The equipment failure sensor may use, for example, an infrared (IR) emitter and detector to detect a temperature rise of the equipment. FIG. 2 illustrates an infrared image in accordance with some aspects. The autonomous infrared thermography shown in FIG. 2 is directed at identifying overhead power line equipment that is entering pre-failure mode. As an electric device begins to fail, it begins losing its ability to dissipate heat sufficiently, which results in higher operating temperatures. As illustrated from the thermal diagram of an IR thermograph system in FIG. 2, an arrester 202 exhibits a temperature significantly higher than other electric equipment connected directly to the grid. This temperature difference is able to be detected. Electric equipment entering pre-failure mode can emit sparks to dried vegetation below even before the device completely fails. Once the device fails, a catastrophic explosion can emit sparks and molten debris to the ground below. A pre-failure mode duration can range between 1 and 180 days depending upon system loading and environmental conditions.

Due to the complexity associated with identifying equipment entering pre-failure mode, most infrared thermography activities are associated with human interaction. Because identification of an adverse condition is dependent upon comparing temperatures to similar equipment and not based upon a specific temperature threshold limit, human interpretation has been used to adjust the infrared camera temperature range based upon ambient temperature and the magnitude of power flowing through the system, which also contributes to the equipment operating temperature. Due to hourly and seasonal power flow fluctuations, equipment operating temperatures for "acceptable" conditions can vary by up to about 70° F., which nullifies the application of fixed thermal limits.

A neural network may be used to analyze and classify thermal image data from the thermal image. Each image may be split into sections for each piece of equipment being analyzed (i.e., each portion of the image representing a different piece of equipment may be analyzed separately), or the entire image may be analyzed as a whole. The classification may be split into multiple categories, including satisfactory or adverse conditions. The classification may be determined from the inputs regardless of the season, system loading, or time of day (which also may be provided as inputs), for example. The neural network is adaptable in that it can be installed and applied to any location on the power system and analyze all equipment within its viewing window. The IR thermograph system may be installed in, for example, all movement detection locations such as a distribution pole or transmission tower, capacitor banks, transformers, and/or insulators.

The sensor 106 may additionally include a current sensor that detects a sudden increase of the current on the high-voltage line 104 on which the sensor 106 is disposed. The current increase may be caused by a short circuit (e.g., due to the high-voltage line 104 contacting the ground). In this case, a current transformer may be installed at a remote location and may use a neural network to identify current flow that represents a fallen conductor within a predetermined distance (e.g., one mile) of the sensor 106. This is unlike existing approaches for identifying a fallen overhead conductor, which include analyzing the current flowing into and out of sparsely located electrical substations that can range over 50 miles from a fallen conductor in a remote location.

Due to the high impedance corresponding to a fallen conductor, many of these events are undetectable by traditional power system protection devices, which monitor impedance and current variations in the system. A fallen conductor can result in a current and/or impedance that is lower than normal conditions. This may inhibit an existing protection system's ability to de-energize the system when a fault occurs, such as what occurred during the Camp Fire of 2018 in California. In this case, it was determined that a conductor jumper between tower spans failed, causing the jumper to intermittently create a short circuit between the overhead power line and the aluminum tower. When fireman arrived on the scene, the power line was still energized, and sparks were falling to the ground. A power monitoring system including the above current sensor may have identified the characteristics of intermittent faulting, thereby preventing this failure from continually dropping sparks onto the dried vegetation below. A Remote Fallen Conductor (RFC) Identifier may be installed in, for example, all movement detection locations and all IR thermography systems locations such as an overhead to underground transition.

Each sensor 106 may transmit data to a neural network that operates, e.g., within a remote server 110 in a centralized location that receives data from sensors 106 across a predetermined geographical area. Each sensor 106 may installed directly onto an associated overhead conductor and through induction draw sufficient power from the power line 104 to support the sensor 106.

In some embodiments, the data collector 108 may simply collect the data and transmit the data via a wireless and/or wired connection to a remote processor/storage device. In other embodiments, the data collector 108 may also analyze the data and/or provide an alarm to indicate the appropriate grid deficiency. That is, in addition to transmitting the data to the neural network for evaluation, if the processor at the data collector 108 is able to provide similar processing as the neural network, or if the neural network provides a set of thresholds for the different scenarios (under the specific conditions that exist at the present) outlined herein to the data collector 108, the data collector 108 may signal an alarm in response to detection of data from the sensor 106 that exceeds the threshold. For example, the data collector 108 may provide alarm information to an alarm outlet more proximate than the (centralized) server 110 on which the neural network operates (e.g., a fire department or utility service station local to the data collector 108). The alarm, whether provided by the neural network or by the data collector 108, may be provided to one or more alarm outlets. The alarm outlets may vary dependent on the scenario detected and/or environmental conditions; for example, if another fire or storm makes traversing the area from a particular local alarm outlet unlikely, another alarm outlet(s) may be selected based on proximity to the data collector 108 or ability to reach the indicated equipment.

The following section describes how the above applications are applied to perform tasks on power systems to prevent wildfires.

Cause 1—(Galloping/Swinging Conductors) and Cause 2—(Broken Jumpers/Connectors)

Galloping conductors is the term utilized to describe overhead power line swinging violently due to high winds. Currently, utilities do not possess equipment that can identify grid related problems caused by galloping conductors. These events can result in overhead power lines contacting each other, which results in line-to-line faults (short circuit) that can initiate sparks and electrical arcing that ignite dried vegetation below. Severe movement can also cause conductor connectors to break, which can result in conductors falling to the ground (CAUSE 2) or slapping against a grounded structure (pole or nearby tree), both of which can ignite a wildfire. Utility companies only have two approaches to prevent these occurrences: using existing protection equipment to monitor for high impedance faults or de-energizing the overhead power line when the weather forecast suggests the occurrence of high winds.

As described previously, utility protection equipment has difficulty in sensing system faults in remote locations. As such, most utilities rely upon de-energizing the system when high winds are expected. De-energizing power lines for this condition is heavily reliant upon identifying high winds prior to them occurring. Unfortunately, in most cases, utility companies are unaware their power lines are experiencing significant winds in remote locations. In addition, prior to re-energizing the line, utility personnel inspect the entire line to ensure that no failures occurred that cannot be sensed with protection equipment, such as a fallen power line.

The monetary impact associated with de-energizing an overhead power line due to high winds can be significant, as the impact is a function of the amount of energy not transmitted or utilized. In many cases, utilities cannot transmit bulk energy through the system and perform rolling blackouts, as in California in 2019. Evaluation of the 2019 CPUC reliability reports produced by PG&E and Southern Cal Edison in 2019, suggests that both companies lost over 125 million dollars in revenue due to rolling blackouts.

In some embodiments, a radar system and neural network identifies all conductor movements and characterizes them as "acceptable" or "adverse". The neural network can interface with the grid's protection system and thereby act as a triggering mechanism to de-energize the line and/or system when "adverse" conditions are detected.

Cause 3—Vegetation Interference

Wildfires may be initiated by the interference of vegetation (e.g., tree branches) with overhead power lines. To prevent line-to-ground faults, utility companies routinely trim tree branches away from the power line. According to a California Berkeley study, utility companies such as PG&E spend over 180 million dollars annually to trim trees away from overhead power lines. Frequency and costs are highly dependent upon the type of vegetation, environmental conditions, and the power line height.

Utility companies pay so much annually for tree trimming services because of the financial impact of vegetation interference. The 2004 northeast blackout was caused when an overhead transmission line interfering with untrimmed tree branches. The blackout resulted in 50 million consumers experiencing outages with an economic impact of 10 billion dollars. In locations where dried vegetation can ignite fires, such as California, vegetation interference can result in costly wildfires. CAL FIRE claims that power line/vegetation interference has only been responsible for 3% of the state's wildfires, however, they resulted in the 20 largest fires in California history prior to 2012.

Additional methods for preventing vegetation interference include proximity/location (e.g., GPS) sensors. The proximity/location sensors may be provided in the sensors 106 or separately and may be configured to monitor the height of a conductor, which can sag into tree branches during high loading conditions and extreme ambient temperature conditions. As current propagates through the aluminum overhead conductor, the flow of electrons generates heat within the metal. If the internal temperature exceeds the standard operating limit of the conductor, the metal elongates, thereby causing the conductor to stretch. Because the conductor is fixed on both ends, the conductor begins sagging in the middle. Unfortunately, GPS sensors can only monitor the height of the lowest point of the power line and cannot monitor the height of any interfering tree branches. In addition, they only monitor one location between transmission towers, which can be separated by several hundred feet. As such, the system does not identify problems associated with insufficient tree trimming activities. Therefore, utilizing these devices to prevent wildfires is not a guaranteed solution.

A location system (e.g., using radar) disclosed herein can provide utility companies with a means to identify when tree branch growth is beginning to approach an overhead power line, regardless of the loading and environmental conditions in addition to or instead of using the GPS system. For a radar system, the radar may be attached to the conductor and may provide a window of observation around the conductor.

Therefore, as the power line moves or sags, so does the observation window. The neural network can implement a buffer zone, which identifies any vegetation that comes within a specific distance of the power line without actually touching the conductor. Once the radar system and neural network identifies a potential adverse condition, the neural network can trigger the grid's protection system. If the radar senses that an overhead branch is encroaching the buffer zone of the conductor, the neural network can notify the appropriate personnel that tree trimming activities are required immediately. Similar effects may be obtained using optical detection systems.

Cause 4—Fallen Power Line(s)

The impedance associated with a fallen overhead conductor can mask the failure from power system protection equipment, which operates circuit breakers when high currents (fault currents) or voltage deviations are sensed. As previously described, existing protection equipment relies upon metering system attributes that may be located over 50 miles away from the fallen power line. Without a solid connection to the ground, the fault impedance associated with a single-line fault can result in minor variations of current, which may also be lower than the load current.

Because of the obstacles associated with sensing fallen conductors, analytical techniques may be used for identifying fallen conductors in remote locations. Several approaches rely upon analyzing the disturbances in a voltage waveform. Other approaches rely upon measuring the power flowing in and out of a system. All these approaches use sampling rates equivalent to synchrophasors, which can cost up to $20 k per device. Unfortunately, all of these approaches rely upon analyzing metered values from locations that might be located well over 50 miles from the fallen power line, which limits the accuracy of all approaches. In addition, none of these methods can identify the exact location of the fallen conductor. As a result, none of these approaches have proven particularly reliable when identifying remote fallen conductors.

Installation of the RFC may permit identification of the occurrence of a fallen power line and also the general location of the event. Unlike existing approaches, the application monitors system attributes and environmental conditions possibly within several miles of a fallen conductor, which enhances its accuracy. Although the neural network operates by analyzing system data, the remote conductor identifier also analyzes environmental conditions, the time of day, load history, and current near the location of the fallen conductor.

Cause 5—Equipment Failure

Equipment entering pre-failure mode can cause fires by emitting sparks due to excessive heat, compromised connections, or both. Utility companies frequently utilize infrared thermography to identify equipment exhibiting excessive heating, indicating failure is imminent. Unfortunately, due to environmental and electrical grid load variations, thermal imaging uses human interpretation of the analysis, as described previously. When accounting for the size of a power system, which can span tens of thousands of miles, utility companies cannot guarantee that all equipment entering pre-failure mode can be identified by field personnel prior to its imminent failure.

The cost of scanning an overhead power line in remote locations every six months has been estimated to be approximately $34/ft. This estimate is based upon two utility workers ($200/hr), 1 vehicle ($800/hr), and an infrared thermography scanning rate of 3000 ft/hr. Performing infrared scanning with drone technology can be cheaper, however, implementation would still require continuous scanning to identify all failures. Due to the nature of equipment failures and the size of a power system, it may be impossible for routine infrared scanning patrols to identify all imminent equipment failures. Implementation of the autonomous infrared thermography system can identify equipment entering pre-failure mode in real-time and is only expected to cost approximately $4-$6/ft.

Accordingly, each sensor 106 may possess the following monitoring functions, which are achieved by the corresponding components: (1) conductor movement and vegetation incursion—a radar system that monitors conductor position with respect to time and identifies when tree branches grow into an observation window; (2) identification of current (Amps) characteristics flowing through the conductor that represents a fallen conductor within a predetermined distance—a current transformer installed on the power line 104 that monitors current flow and characteristics; and (3) excessive heat emitted by equipment entering pre-failure mode—an infrared thermography camera installed to point toward power line equipment.

Each of these sensors 106 may relay raw data back to the neural network, which interprets the data and identifies potential hazards or pending failures within a relatively short amount of time (e.g., milliseconds). The data may be from only the sensor 106 or, if the sensors 106 are networked (communicating, e.g., through network communications or directed via ProSe, WiFi, Zigbee, etc.), one sensor 106 may transmit the data of multiple other sensors. The transmission to the neural network may occur periodically using timer that resets after each transmission. Alternatively, or in addition, the sensors 106 may be configured to transmit when an event occurs, such as sensing a change in a sensed parameter that exceeds a predetermined threshold.

The neural network may take various actions dependent on the received measurements. For example, for the radar system, the neural network may analyze measurements and compare the measurements to threshold limits, which may vary pending upon ambient temperatures and magnitude of current flowing through conductor load conditions.

For the thermography system, the neural network may analyze images from an infrared camera sensor and identify any equipment within the image that exhibits higher than expected temperatures based upon threshold limits. Because threshold limits may vary due to ambient temperatures, seasonal changes, and daily load variations, the neural network continually adjusts the infrared camera thermal range and threshold limits to meet the operational conditions.

For power signature characteristics, the neural network may analyze and identify the characteristics of current (<5 amp) coming from the current transformer that is connected to the conductors. The neural network may then compare the characteristics to "normal operation" characteristics, which can fluctuate based upon time of year, time of day, historical loading for the period, and environmental conditions. The neural network learns to identify "normal operation" characteristics based upon measurements taken by the ROAM sensors installed at other locations on the system, other utility monitoring devices, and environmental meters (e.g., wind and ambient temperature).

The neural network may also use information provided by other utility monitoring systems to establish expected system conditions based upon time of day, season, energy demand on the system, ambient temperature, and wind speed. The neural network may also utilize sensor information from nearby sensors to adjust the sensitivity of the event benchmarks. For example, high winds encountered by sensors in one location may result in the neural network adjusting the threshold limits for sensors in the path of the high winds as they travel.

The neural network may continually utilize monitored data and identified failure events to identify equipment failure characteristics based upon overhead configuration type, conductor size, and span distance. This information may then be utilized to improve threshold benchmarks based upon equipment type, manufacturer, and system topography for a specific utility owned system.

Figure 3:
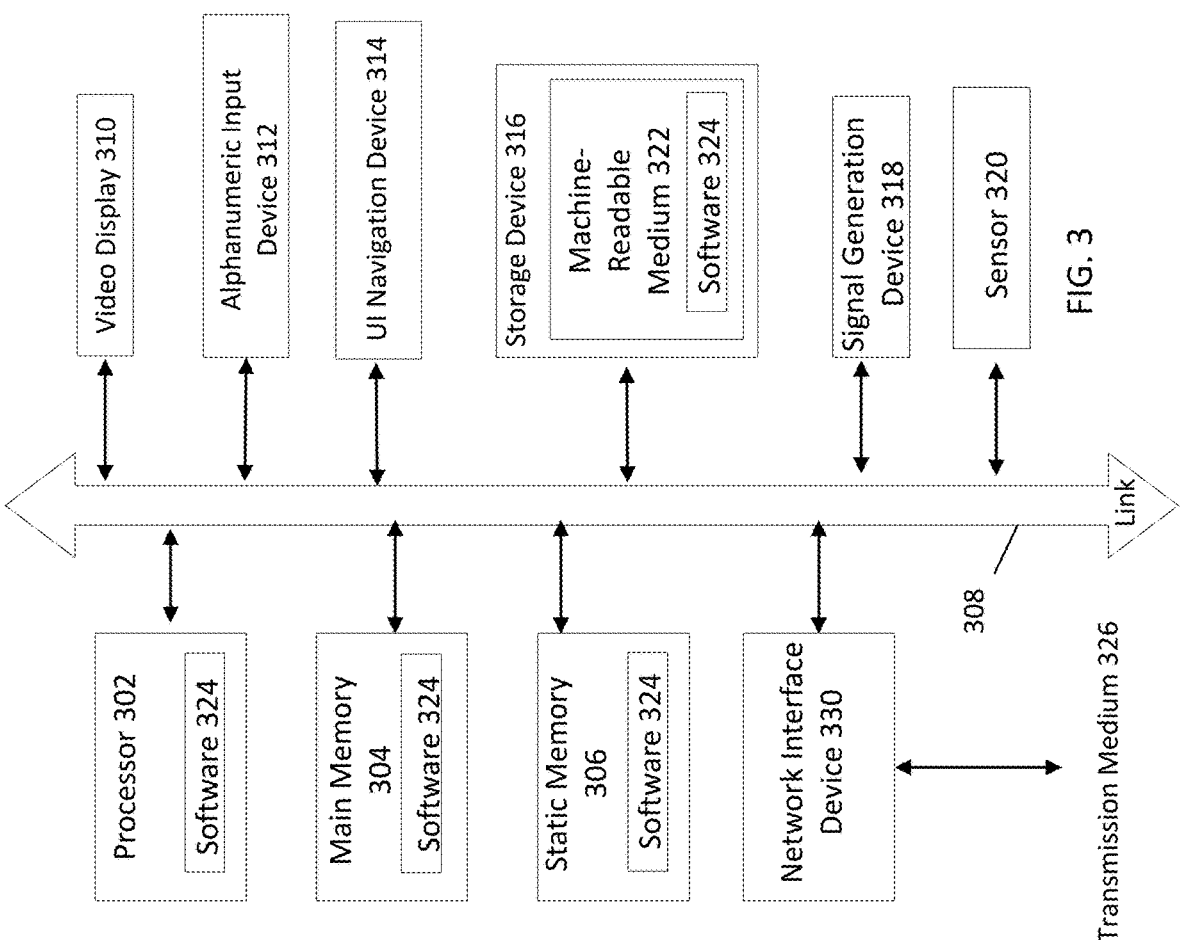
FIG. 3 illustrates a block diagram of a device in accordance with some embodiments.

FIG. 3 illustrates a block diagram of a device in accordance with some embodiments. The device 300 may be any of the devices described above in FIG. 1. Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The device 300 may include some or all of a hardware processor (or equivalently processing circuitry) 302 (e.g., a central processing unit (CPU), a GPU, a hardware processor core, or any combination thereof), a main memory 304 and a static memory 306, some or all of which may communicate with each other via an interlink (e.g., bus) 308. The main memory 304 may contain any or all of removable storage and non-removable storage, volatile memory or non-volatile memory. The device 300 may further include a display unit 310 such as a video display, an alphanumeric input device 312 (e.g., a keyboard), and a user interface (UI) navigation device 314 (e.g., a mouse). In an example, the display unit 310, input device 312 and UI navigation device 314 may be a touch screen display. The device 300 may additionally include a storage device (e.g., drive unit) 316, a signal generation device 318 (e.g., a speaker), a network interface device 330, and one or more sensors, such as a global positioning system (GPS) sensor, compass, accelerometer, temperature sensor, visible/IR sensor, radar detector or other sensor 320. In addition, emitters, such as a visible/IR emitter or radar emitter may be disposed in the device 300. The device 300 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a non-transitory machine readable medium 322 (hereinafter simply referred to as machine readable medium) on which is stored one or more sets of data structures or instructions 324 (e.g., software) embodying or utilized by any one or more of the techniques or functions described herein. The instructions 324 may also reside, completely or at least partially, within the main memory 304, within static memory 306, and/or within the hardware processor 302 during execution thereof by the device 300. While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the device 300 and that cause the device 300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 324 may further be transmitted or received over a communications network using a transmission medium 326 via the network interface device 330 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 330 may include one or more physical jacks (e.g., Ethernet, coaxial, or phone jacks) or one or more antennas to connect to the transmission medium 326.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

The design and functionality of an overhead power line sensor (OPS) is described below. The OPS may rely upon a neural network to identify objects (tree branches or adjacent conductors) that can potentially make physical contact with an overhead power line that is being observed. The sensor may identify potential contact prior to physical contact, thereby allowing avoidance of potential physical contact by de-energizing the overhead power line or removing the physical object.

The OPS may be installed directly onto a primary overhead conductor (rated 5 kV-1000 kV) to permit identification of different adverse conditions within a relatively short amount of time (e.g., milliseconds): a tree branch approaching a primary overhead conductor between 2 towers/poles, and adjacent phase conductor approaching primary overhead conductor due to galloping or excessive swinging of two adjacent conductors. The system includes an overhead line sensor that utilizes a radar system and neural network to identify environmental physical conditions that can potentially contact the conductor.

Overhead Line Sensor Design and Neural Network Structure

In some embodiments, the overhead sensor may contain a frequency-modulated continuous wave (FMCW) multiple-input and multiple-output (MIMO) radar operating at the millimeter wave range through point cloud variations over time. A deep recurrent neural network may be used as a classifier that relies upon environmental physical settings established during installation.

The radar system may include four AWR1243 chips operating at 77 GHz with 12 dBm transmitting power. Each of the AWR1243 possess three transmitters (TXs) and four receivers (RXs), which results in the construction of a 12 virtual RX array for each chip. Cascading four chips makes 192 channels available for evaluation. The radar implements a sparse antenna array for direction of arrival (DOA) estimation. By utilizing a MIMO antenna configuration, the radar can produce a 33×31 2D array, which results in an angular resolution of approximately 3.5 degrees for azimuth as well as elevation. The chirp signal currently utilized has: a duration=50 μsec, 256 chirps per frame, a frame period 100 msec, a chirp slope 19.99 MHz/μsec, a frequency bandwidth=1086.15 MHz, an operating frequency=77 GHz, and an analog-to-digital (A/D) sampling rate 5 MHz. These chirp parameters were established for identifying an aluminum conductor contact and vegetation with the composition and density similar to Fremont Cotton and Western Sycamore. Currently, chirp signal parameters may vary for varying tree species, which can result in variations in the settings.

Figure 4:
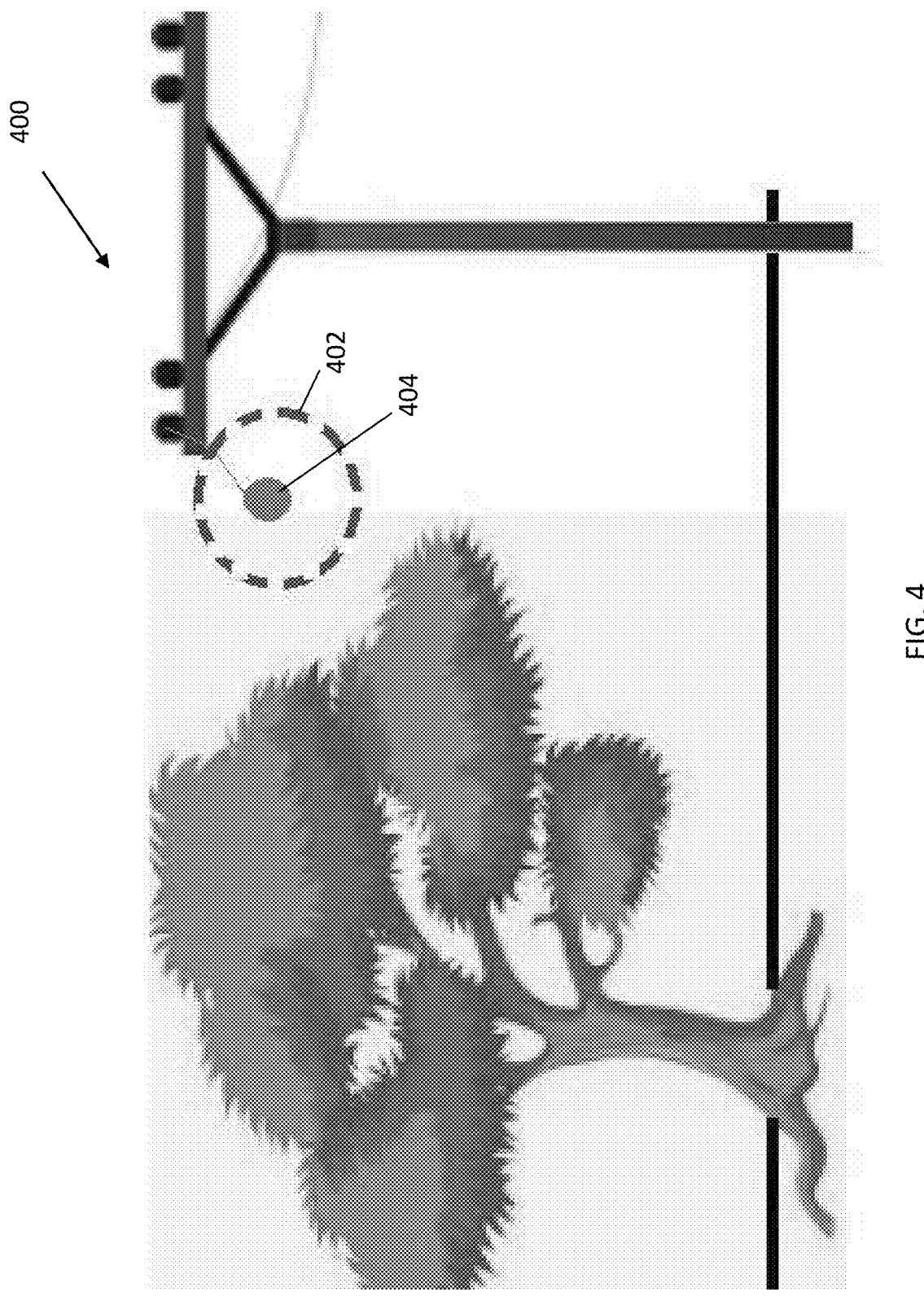
FIG. 4 illustrates an indication of a moving conductor in accordance with some embodiments.

Unlike using radar technology to classify object movement, the radar may be used here to only search for two types of movement within an observation window of several meter in orthogonal (e.g., the x and z) directions, which simplifies the identification process and increases accuracy of those classifications. FIG. 4 illustrates an indication of a moving conductor in accordance with some embodiments. In particular, FIG. 4 illustrates a system 400 having an observation window 402 around a conductor 404.

Figure 5:
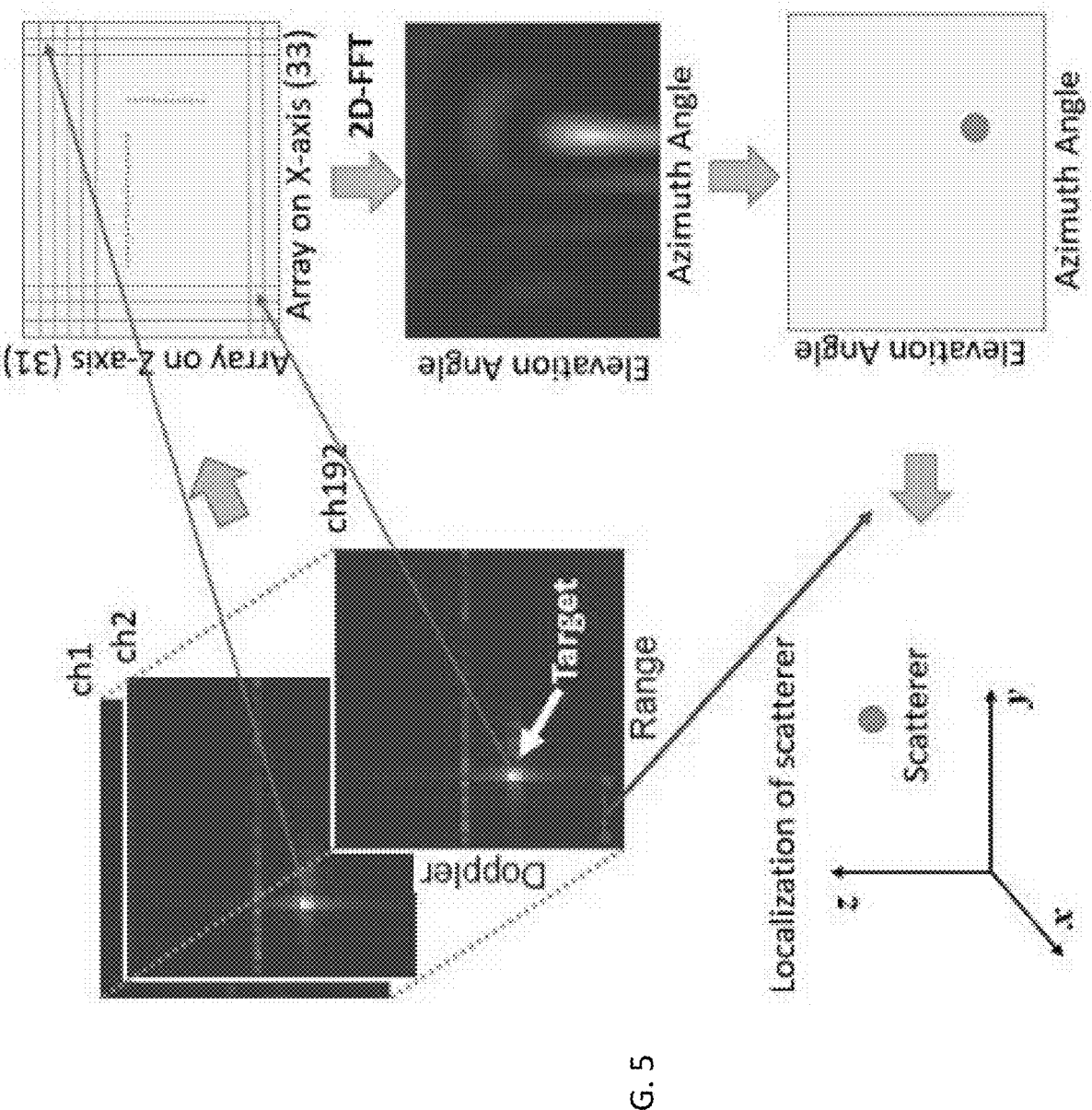
FIG. 5 illustrates localizing point scatter in accordance with some embodiments.
Figures 6A, 6B:
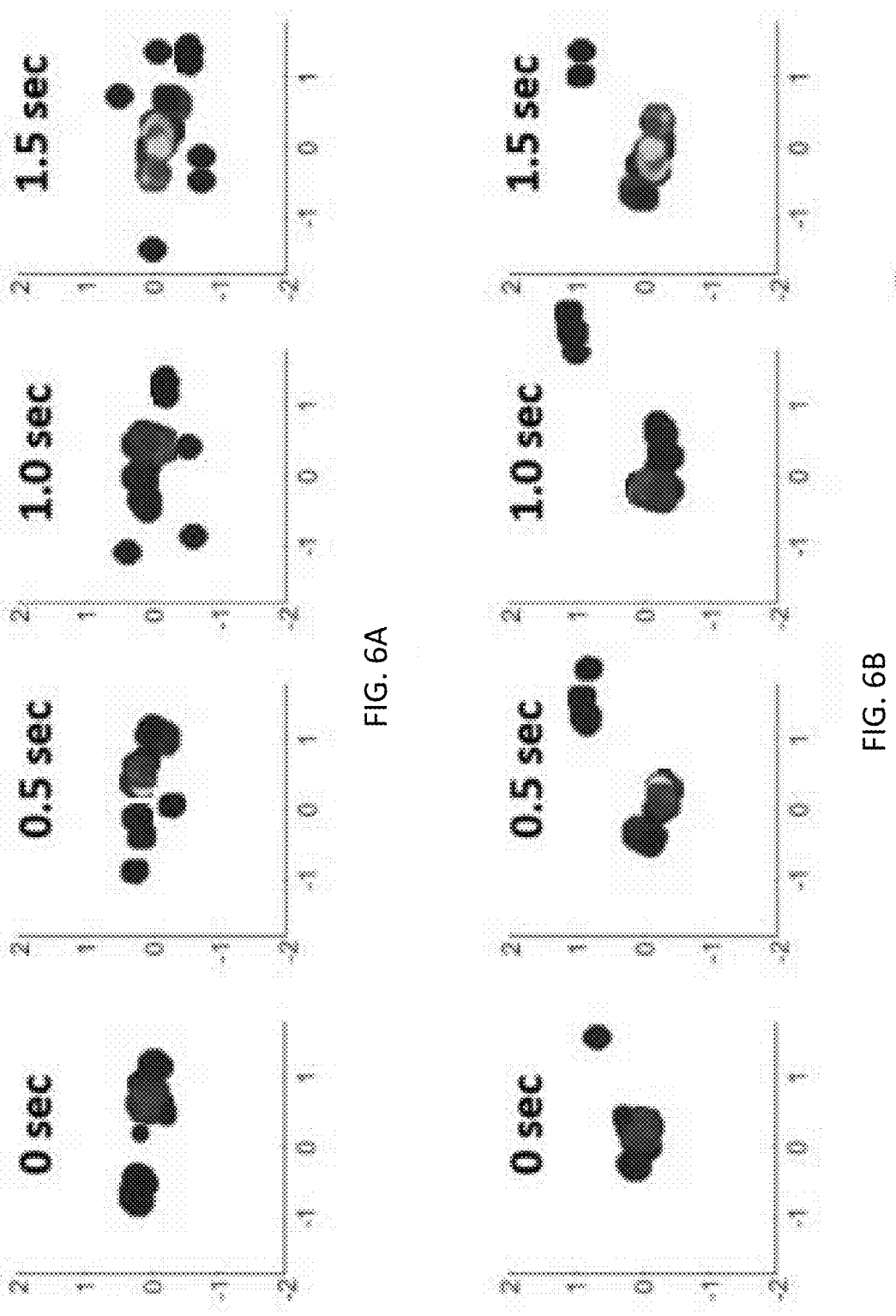
FIG. 6A illustrates point clouds of an overhead conductor swinging in accordance with some embodiments.
FIG. 6B illustrates point clouds of a static overhead conductor with a tree branch in accordance with some embodiments.

Data processing is used to create a point cloud of the Observed conductor 404 and the structures/objects within in viewing observation window 402 shown in FIG. 4. FIG. 5 illustrates localizing point scatter in accordance with some embodiments. In each of the radar receiving channels (192=12 TXs×16 RXs), the A/D converter converts time domain signals to a range-Doppler diagram utilizing 2D Fast Fourier transforms (FFTs). A cell-averaging constant false alarm rate algorithm (CA-CFAR) may be used to identify multiple scatters in the range-Doppler domain for a single channel. After detection, the ranges and Doppler information regarding the scatters may be identified. The scatters may then be used to create a 2D virtual array of size 33×31 shown in FIG. 5. Utilizing the 2D virtual array, the DOA of each scatter may be estimated based its azimuth as well as its distance to line (elevation) by applying a Bartlett algorithm, which corresponds to the 2D FFTs of the phases in the range-Doppler. Once the azimuth and distance are determined, each point in the scatter can be located within a Cartesian coordinate system, as illustrated in FIGS. 6A and 6B. In particular, FIG. 6A illustrates point clouds of an overhead conductor swinging in accordance with some embodiments; FIG. 6B illustrates point clouds of a static overhead conductor with a tree branch beginning to grow into the conductor in accordance with some embodiments.

After identifying the location of the point, the point is represented by a sphere in 3D space defined by Cartesian coordinates. Tree branch interference and a swinging conductor can be defined by movement in orthogonal directions (e.g., horizontal and vertical movement). For shorter conductor spans (e.g., distribution line on the order of 300 inches), the y range can be eliminated, which leaves only the z and x coordinates. For longer lengths, for which it may be desirable to identify the vegetation interference with several meters, the y coordinate may be used to extend the 2D evaluation to a 3D evaluation. The color of each scatter circle in FIGS. 6A and 6B (2-dimension sphere) represents the signal strength.

Aggregating frames from multiple evaluations may improve the identification process. However, point cloud density to provide adequate identification may vary between swinging (galloping) conductors or vegetation interference. Higher movement may use increased density from aggregation, whereas vegetation interference may be able to be identified with fewer frames due to the slow growth. As such, a default aggregation may be based upon identifying a swing conductor, which suggests 10 frames (1 sec). However, this aggregate is based upon a conductor spacing of 2 meters between adjacent conductors. Overhead conductors with wide clearances between conductor and lower midspan dips may use an increased aggregate number. With the aggregated point clouds constructed, the next step is to classify scatter plots into a number of identification types. These types include, but are not limited to, satisfactory movement, minor swinging, severe swinging, potential vegetation growth, and potential contact with adjacent conductor.

To classify conductor movement and contact with an adjacent conductor or tree branch, the procedure may use deep neural networks, which surpass previous classifiers by implementing deep layers that have proven reliable for abstracting and generalization. The approach may use a deep learning application that offers unified architecture for object classification, part segmentation and scene semantic parsing.

Because classification may rely upon time variations for conductor swinging identification, a deep recurrent neural network (DRNN) may be used. The DRNN may have features extracted by a deep convolutional neural network (DCNN). A long short-term memory (LSTM) that possesses a feedback structure may be used to eliminate the vanishing gradient problem. The 3D or 2D point clouds can be recognized through the application of the LSTM. To improve accuracy, features from the point clouds may be extracted from the point clouds instead of inputting the entire point cloud image. Features can be extracted utilizing 2D-DCNN (swing conductors and vegetation interference notification) or 3D-DCNN (vegetation interference location). Because of the varying installation possibilities for each sensor and the varying designs of overhead lines, each sensor installation may employ individual training that is specific to the sensor installation location and based upon acceptable and unacceptable clearance distance between adjacent objects.

Overhead power line spacing may be a function of voltage level, safety clearance requirements, and designer preference. As such, the DRNN may identify conditions specific to its installation environmental condition and physical structure of the power line. The DRNN may be able to identify adverse conditions specific to the construction of the system. After installing the sensor onto the overhead conductor, the installer may make initial classification settings that reflect conductor spacing between phases (x axis), the conductor sag distance (z axis) from connection points, and the distance between acceptable vegetation growth (x and z axis). The initial settings may be used to train the DRNN for its specific environment.

Although 3D evaluations may be applied to identifying lateral distance of tree interference, the settings may be 2D settings on the x and z axis that are extended to all y distances between tower/pole span. Because the sensor is installed onto the conductor directly, establishing the x and y adverse threshold limits establishes an observation window that follows the conductors as each conductor swings and sags. Upon identifying potential adverse conditions (object contact with conductor) based upon threshold limits, the sensor may notify an entity (e.g., the company operating the sensor) within milliseconds via wireless or other communication.

Figure 7:
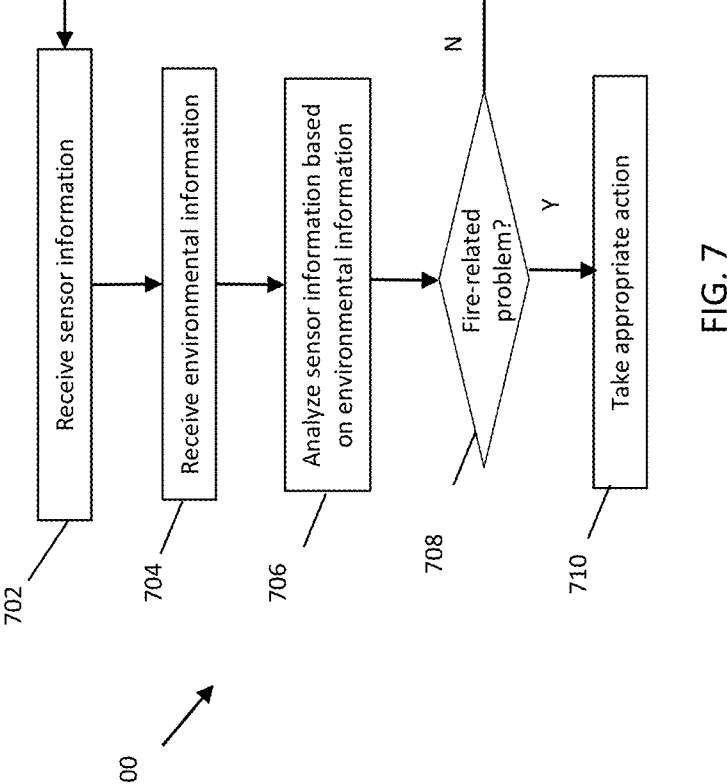
FIG. 7 illustrates a method of fire prevention in accordance with some embodiments.

FIG. 7 illustrates a method of fire prevention in accordance with some embodiments. Not all of the operations may be undertaken in the method 700, and/or additional operations may be present. The operations may occur in a different order from that indicated in FIG. 7. The operations may be performed by the data collector 108 and/or by processing circuitry in the server 110 or a cloud network, for example, implementing instructions stored in a memory.

At operation 702, sensor information may be received. The sensor information may be received in response to a predetermined event occurring (e.g., at periodic intervals or a parameter meeting or changing over a threshold value). The sensor information may include information from one or more of the sensors described above. The sensor information may be obtained from multiple sensors, each of which is configured to detect a different type of input (e.g., radar, IR, power) and may be associated with a different line or other piece of equipment or condition.

At operation 704, the environmental information is obtained. This may include environmental conditions such as ambient temperature and weather, as well as time of day, load history, and current near the location of the conductor, for example.

At operation 706, the sensor information may be analyzed by the neural network based on the environmental information. The neural network may have already been trained based on a significant amount of variation in the environmental information and may be in operation mode rather than training mode. The neural network may be located in the data collector 108, in the server 110 or in or a cloud network, for example.

At operation 708, the neural network may determine whether a fire-related problem is present based on the analysis. The fire-related problem may include whether galloping/swinging conductors (whose movement exceeds a tolerance limit) exist, whether broken jumpers or connectors are present, whether vegetation interference has occurred or is imminent (e.g., may occur within a week or two), whether a power line has fallen, or whether equipment has failed, for example. If not, the method 700 returns to operation 702. The neural network may adjust (or trigger adjustment of) the periodicity of reporting the sensor information (data) dependent on the environmental information and/or proximity/likelihood of the occurrence of a fire-related problem.

At operation 710, in response to a determination that a fire-related problem is present, the neural network may determine and take an appropriate action. Examples of the actions include automatic deactivation of certain equipment or lines within a particular span and notification/dispatching of the appropriate crew to resolve the issue with the particularized instructions (e.g., a tree trimming crew with directions to the location of the vegetation, a replacement crew with the directions to the location and the appropriate replacement equipment).

While only certain features of the system and method have been illustrated and described herein, many modifications and changes will occur to those skilled in the art. It is, therefore, to be understood that the appended claims are intended to cover all such modifications and changes. Method operations may be performed substantially simultaneously or in a different order.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to detect overhead power line problems, the apparatus comprising:
processing circuitry configured to:
receive data including a radar signal, an infrared signal, and at least one of current or impedance associated with the overhead power line,
analyze the data using a neural network,
determine, based on the analysis, whether a fire-related problem has occurred, the analysis including:
based on the radar signal, movement of a conductor or jumper associated with the power line, or intrusion of vegetation within a buffer zone surrounding the conductor,
heating of power line equipment based on the infrared signal, and whether the power line has fallen based on the at least one of current or impedance, and
in response to a determination that the problem has occurred, take an action to mitigate the problem; and
a memory configured to store the data,
wherein the neural network is trained based on weather, ambient temperature, power flow fluctuations through the conductor, acceptable operating temperatures of the power line equipment under different conditions or amount of current flow to determine at least one of whether movement of the power line is excessive, whether a current operating temperature of the power line equipment is acceptable, and an occurrence of intermittent faulting.

2. The apparatus of claim 1 wherein the data further includes environmental conditions, time of day, load history, and current near a location of the conductor.

3. The apparatus of claim 1 wherein the action comprises at least one of:
de-energizing the power line or a power system associated with the power line, or
dispatching tree trimming for the vegetation.

4. The apparatus of claim 1, wherein the infrared signal is configured to indicate whether the power line equipment is in a pre-failure mode by exhibiting an operating temperature significantly higher than that of other similar power line equipment proximate to the power line equipment.

5. The apparatus of claim 1, wherein the current signal is configured to indicate at least one of current or impedance lower than normal conditions.

6. The apparatus of claim 1, wherein the data indicates whether the movement of the conductor or jumper is sufficient to cause connectors of the conductor to break, and whether the conductors are galloping conductors that create sparks due to line-to-line faults between adjacent conductors.

7. The apparatus of claim 1, wherein the fire-related problem includes vegetation interference, based on the radar signal, within a buffer zone of the conductor without contacting the conductor, and the action comprises dispatching tree trimming for the vegetation interference.

8. The apparatus of claim 1, wherein, based on the data in the radar signal, the neural network comprises a deep recurrent neural network implementing deep layers for abstracting and generalization, and that uses a deep learning application for object classification, part segmentation and scene semantic parsing.

9. The apparatus of claim 1, wherein the neural network:
analyzes images from an infrared camera sensor and identifies any equipment within the image that exhibits higher than expected temperatures based upon threshold limits, or
analyzes and identifies characteristics of the current from a current transformer connected to the conductor, then compares the characteristics to normal operation characteristics.

10. The apparatus of claim 1, wherein the neural network continually utilizes monitored data and identifies failure events to identify equipment failure characteristics based upon overhead configuration type, conductor size, and span distance.

11. The apparatus of claim 1, wherein the neural network comprises a deep recurrent neural network (DRNN) having features extracted by a deep convolutional neural network (DCNN), and a long short-term memory (LSTM) having a feedback structure that recognizes 3D or 2D point clouds and extracts the features from the 3D or 2D point clouds.

12. The apparatus of claim 11, wherein when the features comprise a swing conductor and/or a vegetation interference notification, the DCNN extracts the features using 2D point clouds, and when the features comprise a vegetation interference location, the DCNN extracts the features using 3D point clouds.

13. A non-transitory computer-readable storage medium that stores instructions for execution by one or more processors to:

receive, from a data collector, data of a plurality of sensors configured to detect a radar signal emitted from a radar on an overhead conductor or jumper of a power line, an infrared signal of power line equipment, and a current signal along the power line;

analyze the data using a neural network to whether a fire-related problem has occurred, the analysis including:

based on the radar signal, movement of a conductor or jumper associated with the power line, or intrusion of vegetation within a buffer zone surrounding the conductor, heating of power line equipment based on the infrared signal, and whether the power line has fallen based on the at least one of current or impedance;

train the neural network based on weather, ambient temperature, power flow fluctuations through the conductor, acceptable operating temperatures of the power line equipment under different conditions or amount of current flow to determine at least one of whether movement of the power line is excessive, whether a current operating temperature of the power line equipment is acceptable, and an occurrence of intermittent faulting; and in response to a determination that the problem has occurred, take an action to mitigate the problem.

14. The medium of claim 13, wherein the data further includes environmental conditions, time of day, load history, and current near a location of the conductor.

15. The medium of claim 13, wherein the action comprises at least one of:

de-energizing the power line or a power system associated with the power line, or dispatching tree trimming for the vegetation.

16. The medium of claim 13, wherein the infrared signal is configured to indicate whether the power line equipment is in a pre-failure mode by exhibiting an operating temperature significantly higher than that of other similar power line equipment proximate to the power line equipment, and the current signal is configured to indicate at least one of current or impedance lower than normal conditions.

17. The medium of claim 13, wherein the data indicates whether the movement of the conductor or jumper is sufficient to cause connectors of the conductor to break, and whether the conductors are galloping conductors that create sparks due to line-to-line faults between adjacent conductors.

18. The medium of claim 13, wherein the fire-related problem includes vegetation interference, based on the radar signal, within a buffer zone of the conductor without contacting the conductor, and the action comprises dispatching tree trimming for the vegetation interference.

19. The medium of claim 13, wherein the neural network comprises a deep recurrent neural network (DRNN) having features extracted by a deep convolutional neural network (DCNN), and a long short-term memory (LSTM) having a feedback structure that recognizes 3D or 2D point clouds and extracts the features from the 3D or 2D point clouds.

20. The medium of claim 19, wherein when the features comprise a swing conductor and/or a vegetation interference notification, the DCNN extracts the features using 2D point clouds, and when the features comprise a vegetation interference location, the DCNN extracts the features using 3D point clouds.

* * * * *